United States Patent
Yu (10) Patent No.: US 8,122,816 B2
(45) Date of Patent: Feb. 28, 2012

(54) GRILL WITH ADJUSTABLE GRILLING SPACE

(75) Inventor: Jingliang Yu, Fujian (CN)

(73) Assignee: Tsann Kuen (China) Enterprise Co., Ltd., Xiamen, Fujian (CN)

( * ) Notice: Subject to any disclaimer, the term of this patent is extended or adjusted under 35 U.S.C. 154(b) by 601 days.

(21) Appl. No.: 12/332,962

(22) Filed: Dec. 11, 2008

(65) Prior Publication Data

US 2009/0145304 A1   Jun. 11, 2009

(30) Foreign Application Priority Data

Dec. 11, 2007   (CN) ...................... 2007 2 0009107 U (51) Int. Cl.
*A47J 37/06*   (2006.01)
(52) U.S. Cl. ........................................... 99/379; 99/349
(58) Field of Classification Search ............... 99/349, 99/372, 376, 377, 379, 385, 389–391, 393
See application file for complete search history.

(56) References Cited

U.S. PATENT DOCUMENTS

| 1,728,751 | A | * | 9/1929 | Forshee | 99/379 |
|---|---|---|---|---|---|
| 2,033,060 | A | * | 3/1936 | Anderson | 99/379 |
| 2,039,218 | A | * | 4/1936 | Govoroff | 99/379 |
| 2,057,501 | A | * | 10/1936 | Parr | 99/379 |
| 2,607,287 | A | * | 8/1952 | Price | 99/372 |
| 3,998,145 | A | * | 12/1976 | Maisch | 99/376 |
| 4,364,308 | A | * | 12/1982 | John et al. | 99/372 |

FOREIGN PATENT DOCUMENTS

DE          2709326 A1 *  9/1978

* cited by examiner

*Primary Examiner* — Stephen F Gerrity (74) *Attorney, Agent, or Firm* — Kening Li; Pinsent Masons LLP (57) ABSTRACT

A grill comprises an upper shell, a lower shell, an upper grill pan disposed on the bottom surface of the upper shell and a lower grill pan disposed on the top surface of the lower shell, wherein the upper shell connects to the lower shell by hinge mechanisms such that the distance between the two grilling pans is adjustable to accommodate to-be-grilled food items of varying thickness.

10 Claims, 7 Drawing Sheets

GRILL WITH ADJUSTABLE GRILLING SPACE

FIELD OF THE INVENTION

The present invention relates to a grill, more particularly to a grill with adjustable grilling space.

RELATED ART

Common grill usually comprises an upper grill pan and a lower grill pan that is pivoted to the upper grill pan. The food is laid between the two grill pans to be cooked. Such a grill is acceptable for grilling lamellar foods. But when thick food or lumpish food are placed between the two grill pans, the front side of the upper grill pan will incline upwards, and as a consequence the two grill pans will form an angle, resulting in the rear part of the food item to be burnt due to being clamped too tightly while the front part of the food is undercooked due to not being clamped firmly.

To overcome the problem, grills have been designed with adjustable distance between the upper grill pan and the lower grill pan. A common design for this type of grills uses a U-shaped pan support on the lower grill pan, wherein the rear ends of the two side poles of the pan support are pivoted to the two rear corners of the lower grill pan; the front side pole of the grill pan forms a handle; the middle of the two sides of the upper grill pan is pivoted to the insides of the middle of the two side poles of the U-shaped pan support; and the upper grill pan can turn relatively to the pan support by the axis of the connecting line between the two pivot points. The U-shaped pan support can move up and down following the changing distance between the upper grill pan and the lower grill pan, yet the upper grill pan remains parallel to the lower grill pan by turning relatively to the U-shaped pan support. Grills of the above design, however, still have many disadvantages. For example, when the distance between the upper grill pan and the lower grill pan increases, although the upper grill pan can remain parallel with the lower grill pan, the lower grill pan is moved off its vertical position. The bigger the distance between the upper grill pan and the lower grill pan, the greater the displacement of the upper grill pan off its vertical alignment with the lower grill pan. In other words, in order to accommodate thicker food times, vertical alignment between the upper grill pan and the lower grill pan is sacrificed.

The present applicant has also filed a Chinese patent application, number 200520125193.X, entitled "A grill with liftable top cover," which discloses a grill that comprises an upper shell, a lower shell, an upper grill pan embedded into the lower surface of the upper shell and a lower grill pan embedded into the upper surface of the lower shell. The back side of the lower shell has a connecting piece that can move up and down. The upside of the connecting piece protrudes above the lower shell and is pivoted to the back side of the upper grill pan. The lower shell has an elevator mechanism that is connected to the connecting piece and drives the connecting piece to move up and down as well. The distance between the upper grill pan and lower grill pan can be adjusted by the elevator mechanism. However, the elevator mechanism has high production cost, and the elevator mechanism tends to breakdown easily under the weight of the upper grill pan.

Furthermore, with the same grill, users may need to change different grill pans with different depths for adjusting grilling space. If the distance between the upper grill pan and the lower grill pan can't be adjusted or the upper grill pan and the lower grill pan can't be aligned at vertical direction after adjusting, the different grill pans with different depths will not be able to be changed.

SUMMARY OF THE INVENTION

The present invention provides a grill with adjustable grilling space, whose primary object is to overcome the disadvantages of known grills which cannot adjust the distance between the upper grill pan and the lower grill pan, or of the unsatisfactory adjusting mechanisms of known grills.

The present invention adopts the following technical solution. A grill with adjustable grilling space comprises an upper shell, a lower shell, an upper grill pan that is disposed on the bottom surface of the upper shell and a lower grill pan that is disposed on the top surface of the lower shell. The upper shell is connected to the lower shell by hinge mechanisms. The hinge mechanism comprises an upper oscillating rod and a lower oscillating rod. The adjacent ends of the upper oscillating rod and the lower oscillating rod are pivoted to each other, and the removed ends of the upper oscillating rod and the lower oscillating rod are pivoted to the upper shell and lower shell respectively.

In one embodiment of the grill with adjustable grilling space, the removed ends of the upper oscillating rod and the lower oscillating rod are connected to the upper shell and the lower shell by an upper shaft seat and a lower shaft seat respectively. The upper shaft seat and the lower shaft seat are fixed to the upper shell and the lower shell respectively. The removed ends of the upper oscillating rod and the lower oscillating rod are pivoted to the upper shaft seat and the lower shaft seat respectively.

Both the adjacent ends of said upper oscillating rod and said lower oscillating rod have front locating surfaces and back locating surfaces. When the upper shell and the lower shell are closed, the front locating surfaces of the upper oscillating rod and the lower oscillating rod abut against each other. When the upper shell and the lower shell are open, the back locating surfaces of the upper oscillating rod and the lower oscillating rod abut against each other.

Further, a side of the end that is connected to the lower oscillating rod of said upper oscillating rod forms an arc gap; two end surfaces of the arc gap form said front locating surface and back locating surface. The corresponding connecting end of the lower oscillating rod is embedded into the arc gap; the shape of the connecting end is matched with the arc gap.

The end that is connected to the upper shaft seat of said upper oscillating rod has a front abutting surface and a back abutting surface, correspondingly the upper shaft seat has a front abutting surface and a back abutting surface that abut against the front abutting surface and the back abutting surface of the upper oscillating rod. When the upper shell and the lower shell are closed or the upper shell and the lower shell are opened to the most, the back abutting surfaces of the upper oscillating rod and the upper shaft seats abut against each other.

Further, the end that is connected to the upper shaft seat of said upper oscillating rod has a circular arc groove. Two end surfaces of the circular arc groove form said front abutting surface and back abutting surface. Said upper shaft seat forms a raised part that is used to being inserted into the groove; the shape of the raised part is matched with the groove.

The end that is connected to the lower shaft seat of said lower oscillating rod has a front abutting surface and a back abutting surface, correspondingly the lower shaft seat has a front abutting surface and a back abutting surface that abut against the front abutting surface and the back abutting surface of the lower oscillating rod. When the upper shell and the lower shell are closed, or the upper shell and the lower shell are opened to the most, the back abutting surfaces of the lower oscillating rod and the lower shaft seats abut against each other.

Further, the end that is connected to the lower shaft seat of said lower oscillating rod has a circular arc groove. Two end surfaces of the circular arc groove form said front abutting surface and back abutting surface. Said lower shaft seat forms a raised part that is used to being inserted into the groove; the shape of the raised part is matched with the groove.

Further, the removed ends of the upper oscillating rod and the lower oscillating rod are connected to the upper shaft seat and the lower shaft seat by interference fit; the adjacent ends of the upper oscillating rod and the lower oscillating rod are connected to each other by clearance fit.

Further, there are two said hinge mechanisms, which are disposed at the rear ends of left sides and the right sides of the upper shell and the lower shell respectively.

Further, there are pre-tension mechanisms between the upper shaft seat and the upper oscillating rod and between the lower shaft seat and the lower oscillating respectively. The pre-tension mechanism comprises a sliding rod that is disposed in the upper shaft seat or the lower shaft seat slidably, a spring that makes the sliding rod protrude towards the upper oscillating rod or the lower oscillating rod and a locating groove that is matched with the protruding part of the sliding rod and is disposed in the upper oscillating rod or the lower oscillating rod.

As shown in above-mentioned descriptions and compared with the related art, the present invention has advantages as follows. Firstly, the upper shell is connected to the lower shell by adjustable hinge mechanisms, and the distance between them is adjustable, so it can adjust the grilling space between the upper grill pan and the lower grill pan by changing grill pans with different depths, at the same time it can assure that the upper grill pan is aligned with the lower grill pan in vertical direction. Secondly, in grilling thick food, the distance between the upper grill pan and the lower grill pan can be adjusted to fit the food by adjusting hinge mechanisms that are connected to the upper shell and the lower shell. Thirdly, the hinge mechanisms have simple structure, are not broken easily and have low cost.

DETAILED DESCRIPTION OF THE PREFERRED EMBODIMENT

The present invention will be further described according to the drawings and the embodiments.

Embodiment 1

Figure 1:
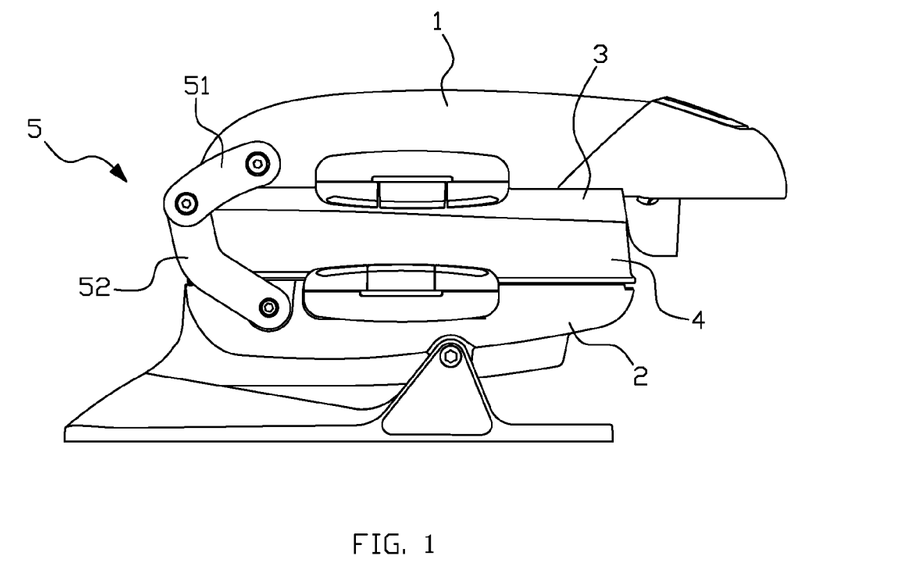
FIG. 1 is a side view of embodiment 1 when a deep grill pan is used.
Figure 3:
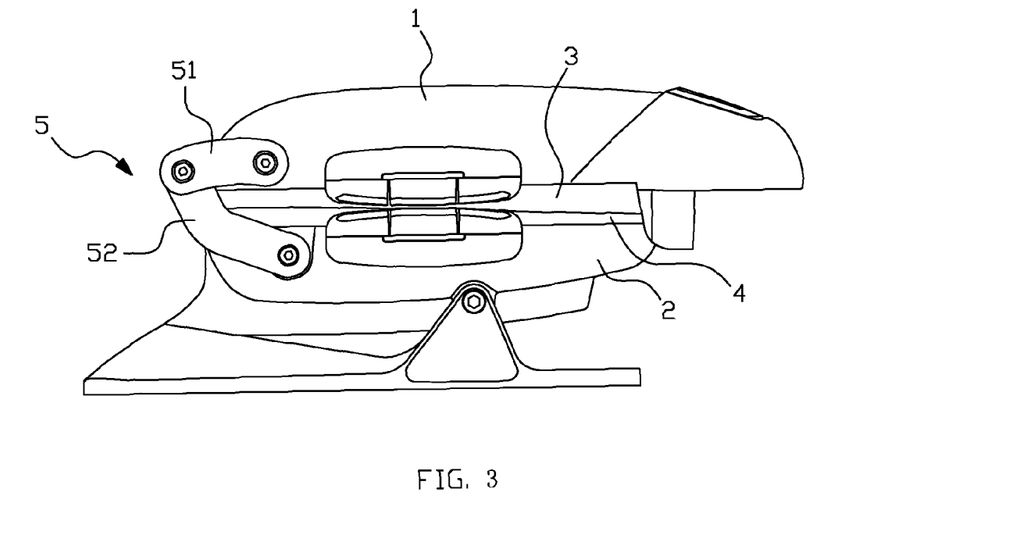
FIG. 3 is a side view of embodiment 1 when a flat grill pan is used.

Referring to FIGS. 1 and 3, a grill with adjustable grilling space, comprises an upper shell 1, a lower shell 2, an upper grill pan 3 that is disposed on the bottom surface of the upper shell 1 and a lower grill pan 4 that is disposed on the top surface of the lower shell 2. The upper shell 1 is connected to the lower shell 2 by hinge mechanisms 5. The hinge mechanism 5 comprises an upper oscillating rod 51 and a lower oscillating rod 52. The adjacent ends of the upper oscillating rod 51 and the lower oscillating rod 52 are pivoted to each other, and the removed ends of the upper oscillating rod 51 and the lower oscillating rod 52 are pivoted to the upper shell 1 and lower shell 2 respectively. There are two hinge mechanisms 5, which are disposed at the rear end of both the left side and the right side of the upper shell 1 and the lower shell 2 respectively. FIG. 1 and FIG. 3 are side views, so there is only one hinge mechanism 5 shown.

Figure 7:
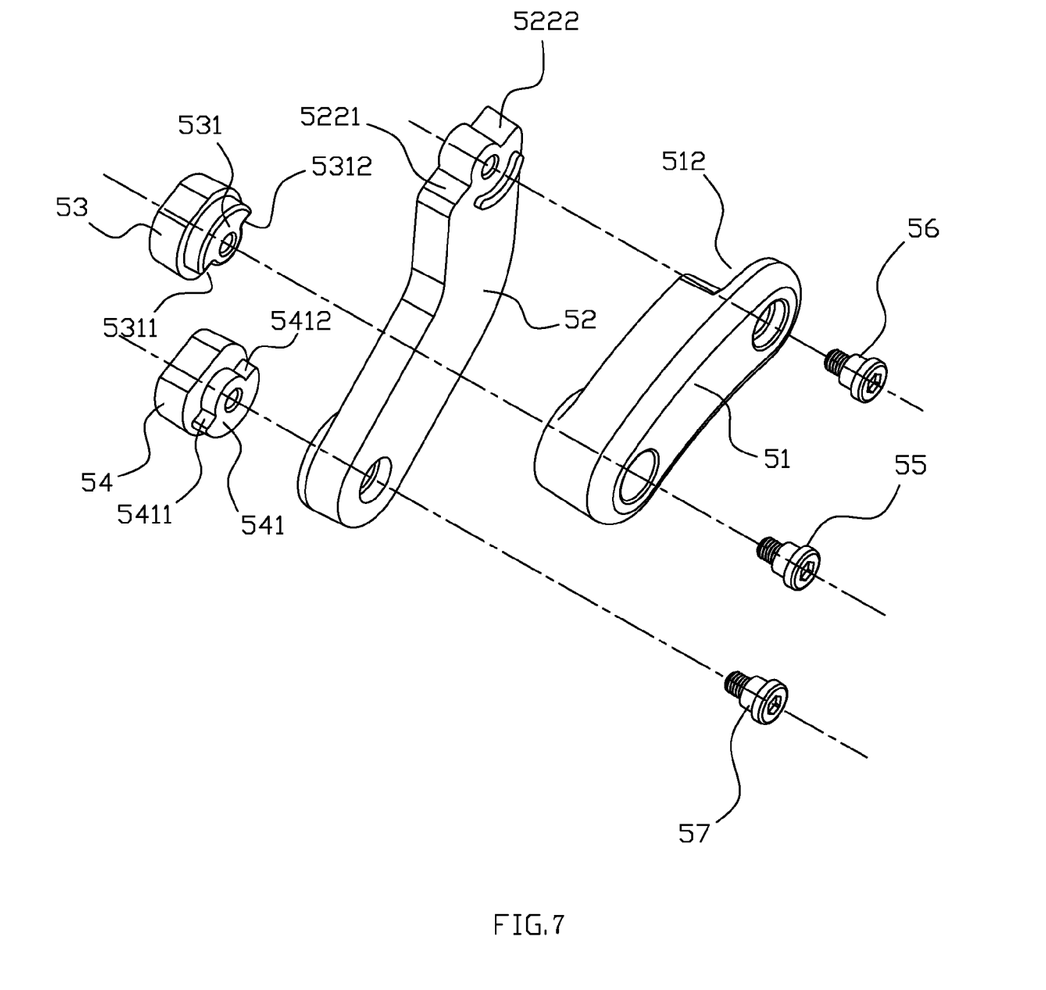
FIG. 7 is an explosive view of hinge mechanism of embodiment 1.

Referring to FIG. 7, the removed ends of the upper oscillating rod 51 and the lower oscillating rod 52 are connected to the upper shell 1 and the lower shell 2 by an upper shaft seat 53 and a lower shaft seat 54 respectively. The upper shaft seat 53 and the lower shaft seat 54 are fixed to the left sides and the right sides of the upper shell 1 and the lower shell 2 respectively. The removed ends of the upper oscillating rod 51 and the lower oscillating rod 52 are pivoted to the upper shaft seat 53 and the lower shaft seat 54 respectively, and the pivot shaft are bolts 55 and 57. The pivot shaft of the adjacent ends of the upper oscillating rod 51 and the lower oscillating rod 52 is bolt 56.

Figure 2:
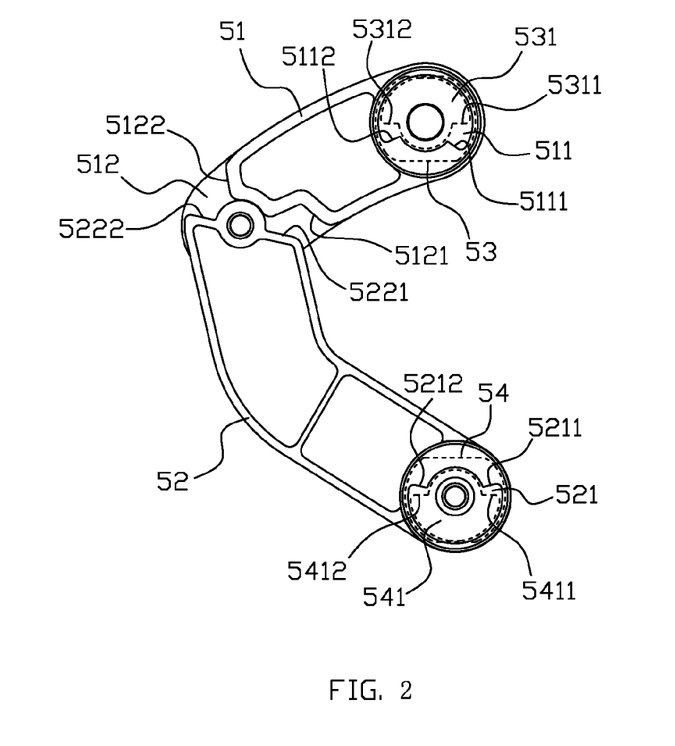
FIG. 2 is a side view of hinge mechanism of embodiment 1 when a deep grill pan is used.
Figure 4:
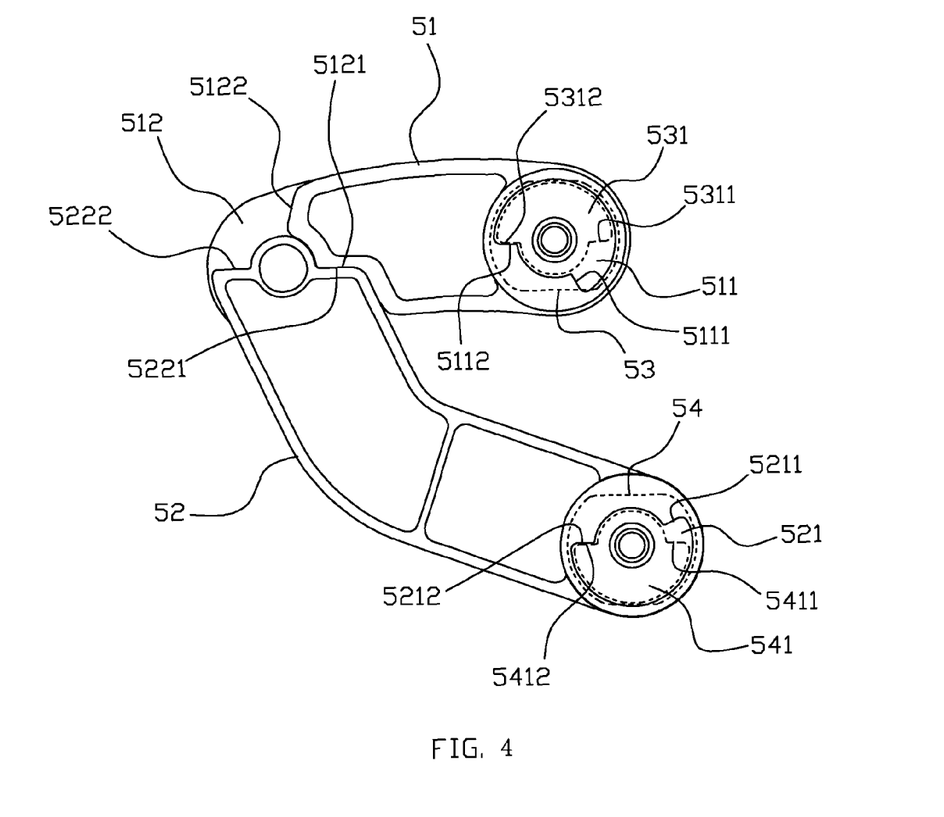
FIG. 4 is a side view of hinge mechanism of embodiment 1 when a flat grill pan is used.
Figure 5:
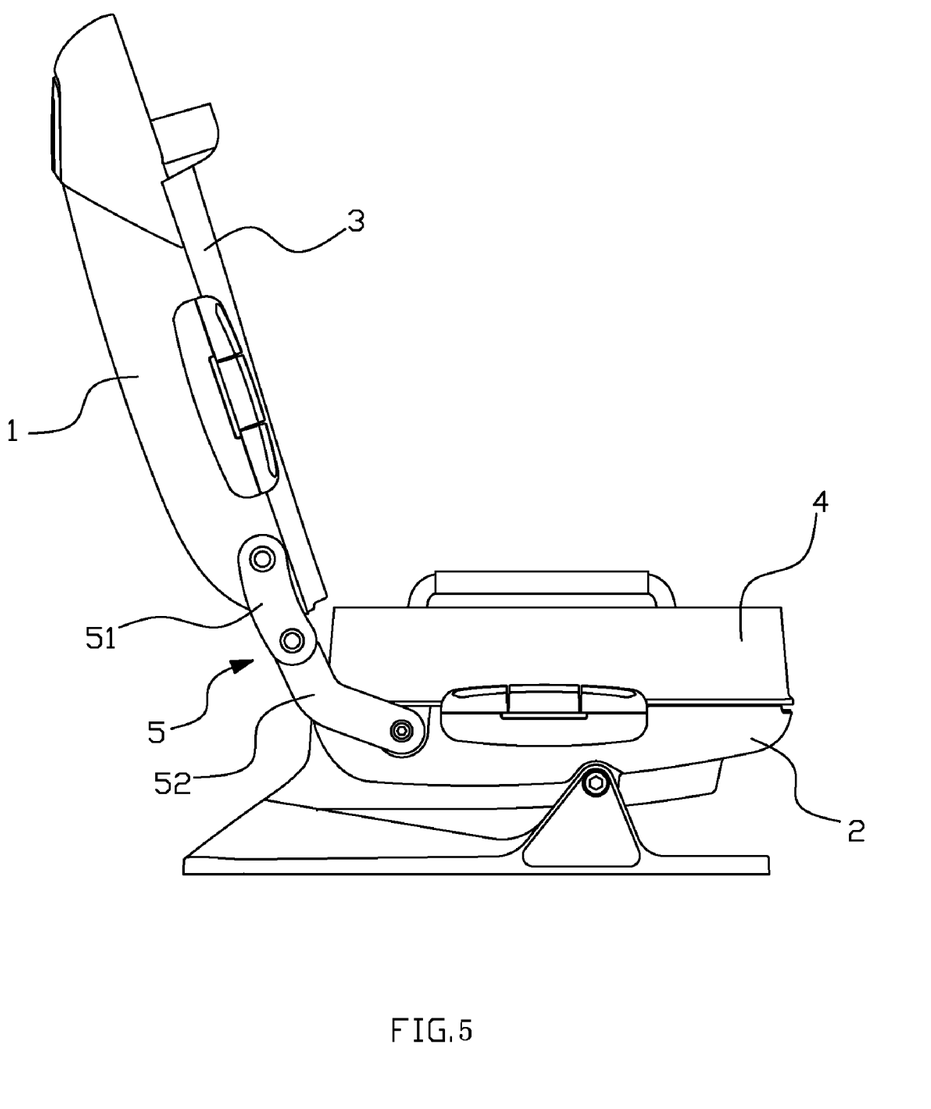
FIG. 5 is a side view of embodiment 1 when the upper grill pan and the lower grill pan are open.
Figure 6:
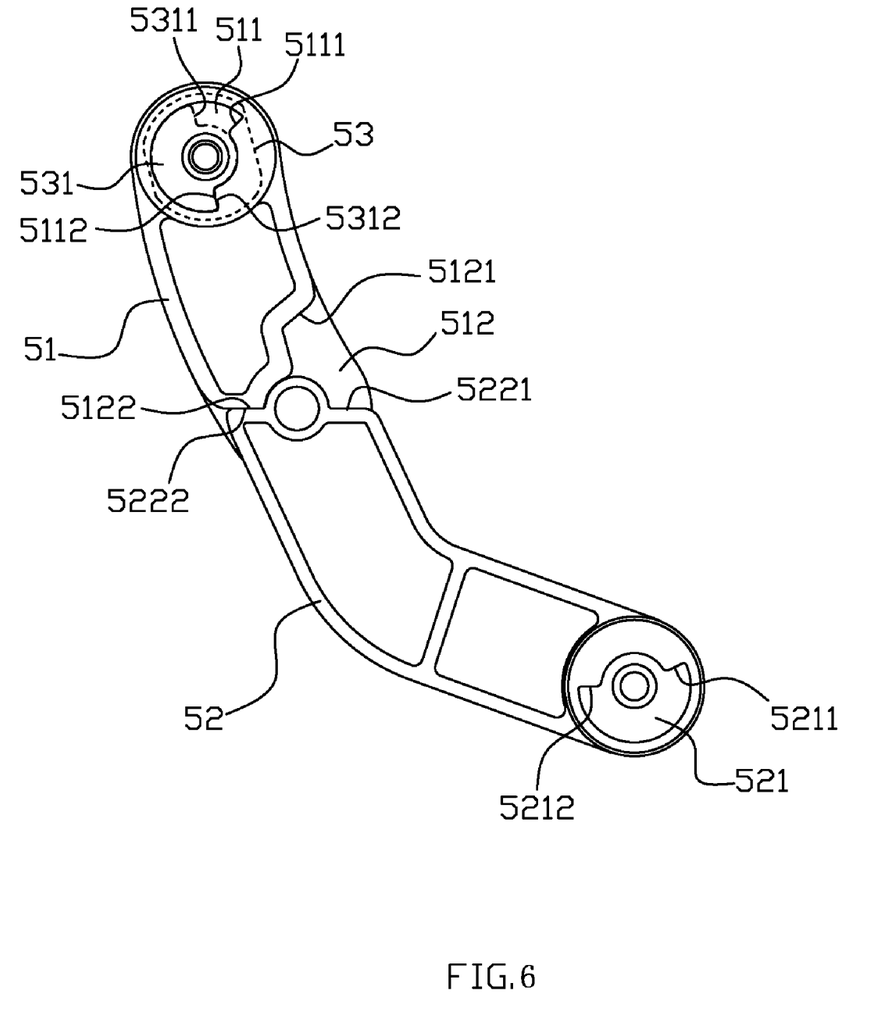
FIG. 6 is a side view of hinge mechanism of embodiment 1 when the upper grill pan and the lower grill pan are open.

Referring to FIGS. 2, 4, 6 and 7, a side of the end that is connected to the lower oscillating rod 52 of the upper oscillating rod 51 forms an arc gap 512; the center of the arc gap 512 is the bolt 56. Two end surfaces of the arc gap 512 form a front locating surface 5121 and a back locating surface 5122. The corresponding connecting end of the lower oscillating rod 52 is embedded into the arc gap 512; the shape of the connecting end is matched with the arc gap 512. The lower oscillating rod 52 has a front locating surface 5221 and a back locating surface 5222 that are matched with the front locating surface 5121 and the back locating surface 5122. Referring to FIGS. 3 and 4, when the upper shell 1 and the lower shell 2 are closed, the front locating surface 5121 of the upper oscillating rod 51 and the front locating surface 5221 of the lower oscillating rod 52 abut each other. Referring to FIGS. 5 and 6, when the upper shell 1 and the lower shell 2 are open, the back locating surface 5122 of the upper oscillating rod 51 and the back locating surface 5222 of the lower oscillating rod 52 abut each other. Referring to FIGS. 1 and 2, when deep grill pan is adopted or when the upper grill pan 3 and the lower grill pan 4 are parallel and there is some distance between them, the front locating surfaces 5121 and 5221 or the back locating surfaces 5122 and 5222 do not abut each other.

Referring to FIGS. 2, 4, 6 and 7, the end of the upper oscillating rod 51 that is connected to the upper shaft seat 53 has a circular arc groove 511 with the center being the bolt 55. Two end surfaces of the circular arc groove 511 form a front abutting surface 5111 and a back abutting surface 5112. The upper shaft seat 53 forms a raised part 531 that is used to being inserted into the groove 511; the shape of the raised part 531 is matched with the groove 511. The raised part 531 has a front abutting surface 5311 and a back abutting surface 5312 that are matched with the front abutting surface 5111 and the back abutting surface 5112 of the groove 511. Referring to FIGS. 3 and 4, when the upper shell 1 and the lower shell 2 are closed, the back abutting surface 5112 of the upper oscillating rod 51 abuts against the back abutting surface 5312 of the upper shaft seat 53. Referring to FIGS. 5 and 6, when the upper shell 1 and the lower shell 2 are opened to the most, the back abutting surface 5112 of the upper oscillating rod 51 abuts against the back abutting surface 5312 of the upper shaft seat 53 as well.

Referring to FIGS. 2, 4, 6 and 7, the end that is connected to the lower shaft seat 54 of the lower oscillating rod 52 has a circular arc groove 521 with the center being the bolt 57. Two end surfaces of the circular arc groove 521 form a front abutting surface 5211 and a back abutting surface 5212. The lower shaft seat 54 forms a raised part 541 that is used to being inserted into the groove 521; the shape of the raised part 541 is matched with the groove 521. The raised part 541 has a front abutting surface 5411 and a back abutting surface 5412 that are matched with the front abutting surface 5211 and the back abutting surface 5212. Referring to FIG. 4, when the upper shell 1 and the lower shell 2 are closed, the back abutting surface 5211 of the lower oscillating rod 52 abuts against the back abutting surface 5411 of the lower shaft seat 54; when the upper shell 1 and the lower shell 2 are opened to the most, the back abutting surface 5211 of the lower oscillating rod 52 abuts against the back abutting surface 5411 of the lower shaft seat 54 as well.

Further, the removed ends of the upper oscillating rod 51 and the lower oscillating rod 52 are connected to the upper shaft seat 53 and the lower shaft seat 54 by interference fit; the adjacent ends of the upper oscillating rod 51 and the lower oscillating rod 52 are connected to each other by clearance fit. So in normal state, the upper oscillating rod 51 cannot turn relatively to the upper shell 1 and the lower oscillating rod 52 cannot turn relatively to the lower shell 2. Only when grill pans with different depths are changed, relative angles between the upper oscillating rod 51 and the upper shell 1 and the lower oscillating rod 52 and the lower shell can be adjusted.

Embodiment 2

Figure 8:
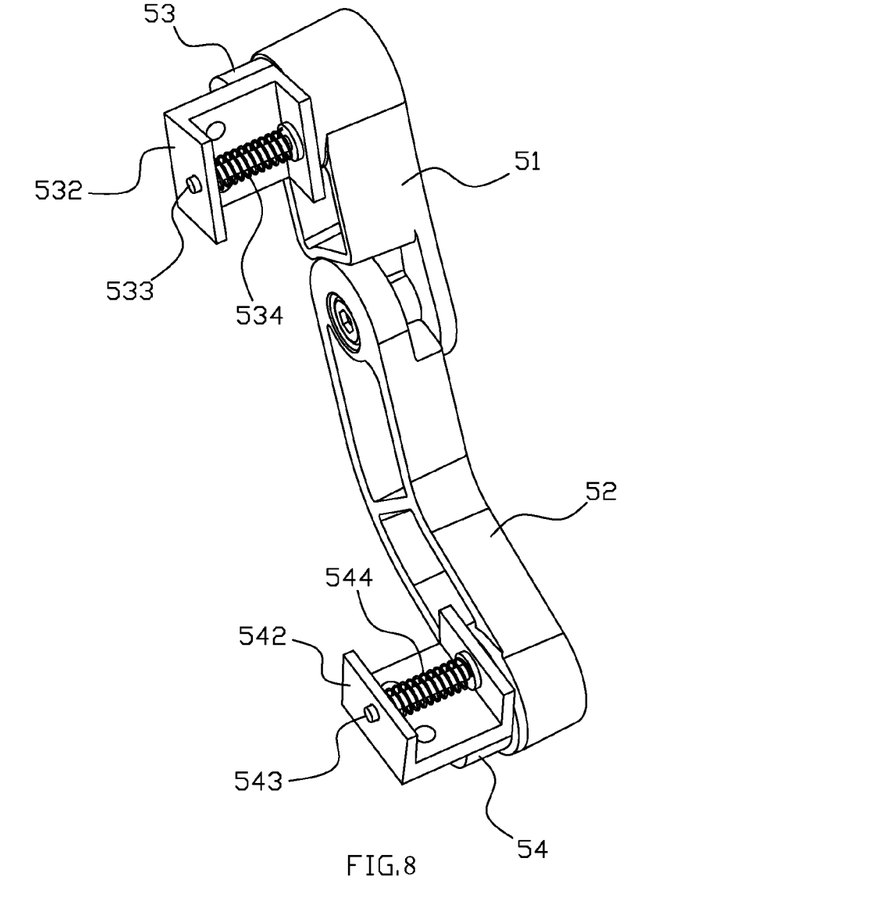
FIG. 8 is a perspective view of hinge mechanism of embodiment 2.
Figure 9:
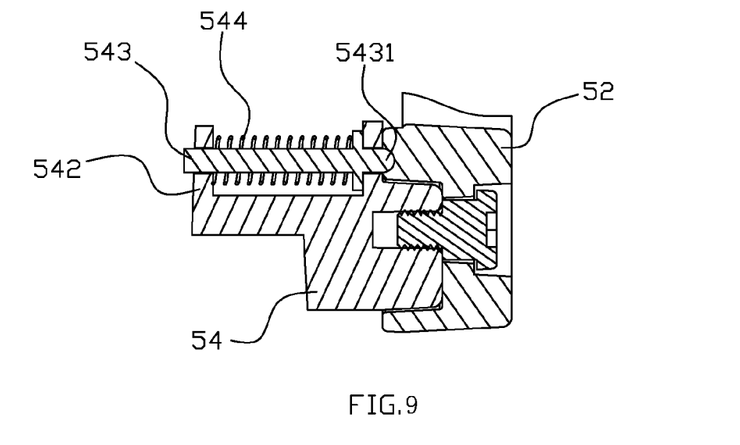
FIG. 9 is a cutaway view of the connection of the lower oscillating rod of hinge mechanism and the lower shaft seat of embodiment 2.
Figure 10:
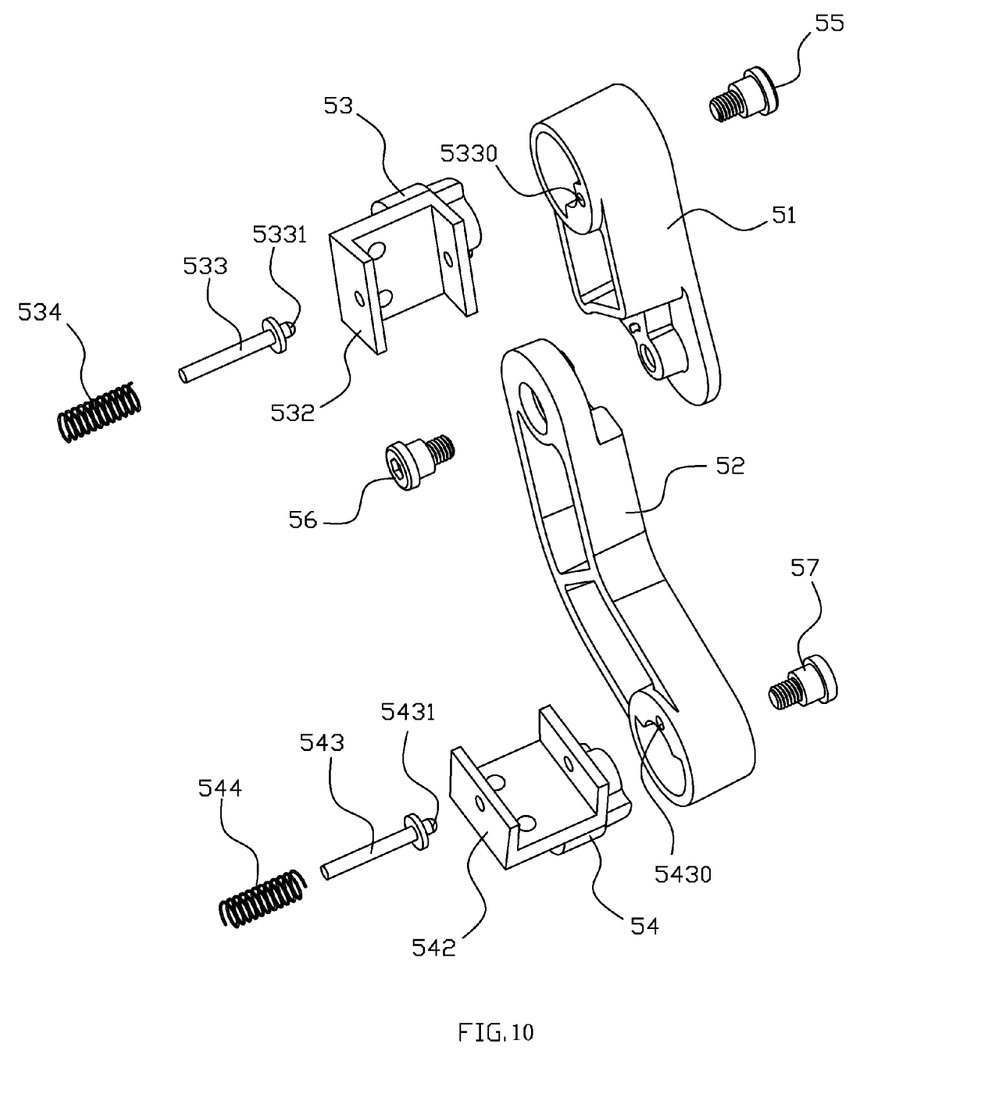
FIG. 10 is an explosive view of hinge mechanism of embodiment 2.

Referring to FIGS. 8 and 10, the embodiment has a similar structure to embodiment 1. The difference= is that there are pre-tension mechanisms between the upper shaft seat 53 and the upper oscillating rod 51 and between the lower shaft seat 54 and the lower oscillating rod 52.

The pre-tension mechanism between the lower shaft seat 54 and the lower oscillating rod 52 is illustrated below as an example. Referring to FIGS. 8 and 10, the pre-tension mechanism comprises a sliding rod 543 disposed slidably in the lower shaft seat 54, a spring 544 that makes the sliding rod 543 protrude towards the lower oscillating rod 52 and a locating groove 5430 that is matched with the protruding part 5431 of the sliding rod 543 and is disposed in the lower oscillating rod 52.

When there is some distance between the upper grill pan 3 and the lower grill pan 4, just as shown in FIG. 1, the protruding part 5431 of the sliding rod 543 is matched with the locating groove 5430 of the lower oscillating rod 52 to ensure that the lower oscillating rod 52 is located relatively to the lower shaft seat 54. The lower shaft seat 54 has an integrative U-shaped piece 542. The sliding rod 543 gets through and is disposed slidably between the two side walls of the U-shaped piece 542. The spring covers the sliding rod 543.

Referring to FIGS. 8 and 10, the pre-tension mechanism between the upper shaft seat 53 and the upper oscillating rod 51 has the same structure with the pre-tension mechanism between the lower shaft seat 54 and the lower oscillating rod 52. Corresponding parts are the sliding rod 533, the protruding part 5331, the spring 534, the U-shaped piece 532 and the locating groove 5330.

The foregoing description of the exemplary embodiments of the invention has been presented for the purposes of illustration and description. It is not intended to be exhaustive or to limit the invention to the precise form disclosed. Many modifications and variations are possible in light of the above teachings. All changes that come within the meaning and range of equivalency of the claims are to be embraced within their scope.

What is claimed is:

1. A grill which comprises an upper shell, a lower shell, an upper grill pan disposed on the bottom surface of the upper shell and a lower grill pan disposed on the top surface of the lower shell, wherein the upper shell is connected to the lower shell by a hinge mechanism which comprises:

an upper rod pivoted at its first end to the upper shell by an upper shaft seat, and a lower rod pivoted at its first end to the lower shell by a lower shaft seat, wherein the upper rod is pivoted at the second end to the second end of the lower rod, configured such that the distance between the upper and lower grilling pan is adjustable, wherein each of the second ends of the upper rod and the lower rod has a front locating surface and a back locating surface, and when the upper shell and the lower shell are closed, the front locating surfaces of the upper rod and the lower rod abut against each other, and when the upper shell and the lower shell are open, the back locating surfaces of the upper rod and the lower rod abut against each other.

2. The grill according to claim 1, wherein the second end of the upper rod comprises a concave or convex portion which separates the front locating surface and back locating surface of the upper rod; and the second end of the lower rod comprises a corresponding convex or concave portion which separates the front locating surface and back locating surface of the lower rod and fits into the concave or convex portion of the upper rod.

3. The grill according to claim 1, wherein the first end of said upper rod has a front abutting surface and a back abutting surface, correspondingly the upper shaft seat has a front abutting surface and a back abutting surface that respectively abut against the front abutting surface and the back abutting surface of the upper rod, such that when the upper shell and the lower shell are closed or are fully opened, the back abutting surfaces of the upper rod and the upper shaft seat abut against each other.

4. The grill according to claim 3, wherein the first end of said upper rod comprises a circular arc groove separating the front abutting surface and the back abutting surface; and wherein said upper shaft seat forms a raised part insertable into the groove, and wherein the shape of the raised part matches the shape of the groove.

5. The grill according to claim 1, wherein the first end of said lower rod has a front abutting surface and a back abutting surface, correspondingly the lower shaft seat has a front abutting surface and a back abutting surface that respectively abut against the front abutting surface and the back abutting surface of the lower rod, such that when the lower shell and the upper shell are closed or are fully opened, the back abutting surfaces of the lower rod and the lower shaft seat abut against each other.

6. The grill according to claim 5, wherein the first end of said lower rod comprises a circular arc groove separating the front abutting surface and the back abutting surface; and wherein said lower shaft seat forms a raised part insertable into the groove, and wherein the shape of the raised part matches the shape of the groove.

7. The grill according to claim 1, wherein the first ends of the upper rod and the lower rod are respectivly connected to the upper shaft seat and the lower shaft seat by interference fit; the second ends of the upper rod and the lower rod are connected to each other by clearance fit.

8. The grill according to claim 1, comprising two hinge mechanisms disposed on either side.

9. The grill according to claim 1, further comprising a pre-tension mechanism between the upper shaft seat and the upper rod, and a pre-tension mechanism between the lower shaft seat and the lower rod.

10. The grill according to claim 9, wherein said pre-tension mechanism comprises a sliding rod slidably disposed in the upper shaft seat or the lower shaft seat, a spring that makes the sliding rod protrude towards the upper rod or the lower rod, and a locating groove matched with the protruding part of the sliding rod and is disposed in the upper rod or the lower rod.

* * * * *